United States Patent
Marom (10) Patent No.: US 11,148,807 B2
(45) Date of Patent: Oct. 19, 2021

(54) HOVERING AERIAL VEHICLE AND METHOD OF FLYING SAME

(71) Applicant: ISRAEL AEROSPACE INDUSTRIES LTD., Lod (IL)

(72) Inventor: Daniel Marom, Petah Tikva (IL)

(73) Assignee: ISRAEL AEROSPACE INDUSTRIES LTD., Lod (IL)

(*) Notice: Subject to any disclaimer, the term of this patent is extended or adjusted under 35 U.S.C. 154(b) by 660 days.

(21) Appl. No.: 15/528,980

(22) PCT Filed: Nov. 2, 2016

(86) PCT No.: PCT/IL2016/051182
§ 371 (c)(1),
(2) Date: May 23, 2017

(87) PCT Pub. No.: WO2017/077531
PCT Pub. Date: May 11, 2017

(65) Prior Publication Data
US 2017/0267345 A1 Sep. 21, 2017

(30) Foreign Application Priority Data
Nov. 3, 2015 (IL) .......................................... 242418

(51) Int. Cl.
*B64D 1/12* (2006.01)
*B64C 39/02* (2006.01)
(Continued)

(52) U.S. Cl.
CPC ................ *B64D 1/12* (2013.01); *B64C 39/02* (2013.01); *B64C 39/024* (2013.01); *B64D 1/02* (2013.01);
(Continued)

(58) Field of Classification Search
CPC ... B64D 1/08; B64D 1/10; B64D 1/12; B64D 1/22; B64C 39/02
See application file for complete search history.

(56) References Cited

U.S. PATENT DOCUMENTS

| 3,503,574 A * | 3/1970 | Karl ...................... B64C 39/022 244/17.17 |
| 9,346,547 B2 * | 5/2016 | Patrick .................. B64C 39/024 |

(Continued)

FOREIGN PATENT DOCUMENTS

| CN | 1470432 A | 1/2004 |
| CN | 104118559 A | 10/2014 |

(Continued)

OTHER PUBLICATIONS

International Search Report and Written Opinion for International Application PCT/IL2016/051182 dated Feb. 7, 2017.

*Primary Examiner* — Richard R. Green
*Assistant Examiner* — Steven J Shur
(74) *Attorney, Agent, or Firm* — Dorsey & Whitney LLP (57) ABSTRACT

A hovering aerial vehicle is provided, comprising an airborne unit and an auxiliary unit. The airborne unit is configured to carry the auxiliary unit during flight and comprises a flight system configured to facilitate providing aerodynamic lift to facilitate hovering of the vehicle. The auxiliary unit comprises an electrical power source in electrical communication with the flight system to provide electrical power for its operation. The hovering aerial vehicle further comprises a decoupling system configured to facilitate selectively switching the vehicle between a detached configuration thereof wherein the airborne and auxiliary units are remote from each other, and an attached configuration thereof wherein the airborne and auxiliary units are secured to one another, and to maintain the elec- (Continued)

trical communication when the vehicle is in its detached configuration.

20 Claims, 4 Drawing Sheets (51) Int. Cl.
*B64D 1/02* (2006.01)
*B64D 1/10* (2006.01)
*B64D 1/22* (2006.01)
*B64D 1/08* (2006.01)

(52) U.S. Cl.
CPC ................ *B64D 1/08* (2013.01); *B64D 1/10* (2013.01); *B64D 1/22* (2013.01); *B64C 2201/027* (2013.01); *B64C 2201/042* (2013.01); *B64C 2201/088* (2013.01); *B64C 2201/108* (2013.01); *B64C 2201/128* (2013.01)

(56) References Cited

U.S. PATENT DOCUMENTS

| | | | |
|---|---|---|---|
| 2003/0066932 A1 * | 4/2003 | Carroll | ................ B64C 39/028 244/120 |
| 2005/0230527 A1 | 10/2005 | Silansky et al. | |
| 2013/0215433 A1 | 8/2013 | Crampton | |

FOREIGN PATENT DOCUMENTS

| | | | | |
|---|---|---|---|---|
| WO | WO 2007/141795 | | 12/2007 | |
| WO | WO-2007141795 A1 * | | 12/2007 | ........... B64C 39/024 |
| WO | WO 2015/076886 | | 5/2015 | |

* cited by examiner

HOVERING AERIAL VEHICLE AND METHOD OF FLYING SAME

TECHNOLOGICAL FIELD

The presently disclosed subject matter is directed toward hovering aerial vehicles.

BACKGROUND

Unmanned aerial vehicles (UAV's) are commonly used to perform missions in places where it would be impractical, for one or more reasons, for human personnel to perform them. Typically, such missions are for surveillance, but they may also be for purposes of scientific research, agriculture, search and rescue, etc. The range of a UAV depends largely on its weight and battery capacity.

One type of UAV is a hovering aerial vehicle, which is configured to remain airborne in one location for a sustained period of time. Such UAV's typically comprise a plurality of rotors designed to operate together to allow the UAV to fly from place to place, hover, ascent and descend, and correct deviations from anticipated behavior, such as pitching and rolling.

SUMMARY

According to one aspect of the presently disclosed subject matter, there is provided a hovering aerial vehicle comprising an airborne unit and an auxiliary unit, wherein:
the airborne unit is configured to carry the auxiliary unit during flight and comprises a flight system configured to facilitate providing aerodynamic lift to facilitate hovering of the vehicle; and
the auxiliary unit comprises an electrical power source in electrical communication with the flight system to provide electrical power for its operation;
the hovering aerial vehicle further comprising a decoupling system configured to:
facilitate selectively switching the vehicle between a detached configuration thereof wherein the airborne and auxiliary units are remote from each other, and an attached configuration thereof wherein the airborne and auxiliary units are secured to one another; and
maintain the electrical communication when the vehicle is in its detached configuration.

The vehicle may be configured, when in its attached configuration, to provide electrical communication between the electrical power source and the flight system using elements separate from the decoupling system.

The decoupling system may comprise one or more cables configured to maintain the electrical communication and attached, at opposite ends thereof, to the airborne and auxiliary units.

The decoupling system may further comprise a winch configured to selectively release and retract the cables.

The winch may be mounted to the airborne unit.

The winch may be mounted to the auxiliary unit.

The decoupling system may comprise two of the cables, wherein points of attachments of the cables to the airborne unit are spaced from each other a first distance, and points of attachments of the cables to the auxiliary unit are spaced from each other a second distance greater than the first distance.

The decoupling system may comprise a winch mounted to the airborne unit and configured to selectively release and retract the cables.

The vehicle may be configured such that a first of the cables carries a positive electrical charge from the electrical power source to the flight system, and a second of the cables carries a negative electrical charge from the electrical power source to the flight system.

The decoupling system may be configured to determine the tautness of the cables when the vehicle is in its detached configuration.

The decoupling system may comprise a motor and is configured to detect the tautness by measuring the current thereof.

The decoupling system may be configured to maintain the electrical communication using wireless energy transmission.

The vehicle may further comprise a tracking system configured to facilitate location of the auxiliary unit and to facilitate navigation of the airborne unit thereto.

The auxiliary unit may comprise a floatation arrangement configured to facilitate the auxiliary arrangement floating on a body of water. The auxiliary unit may comprise a watertight housing containing the electrical power source therewithin.

The auxiliary unit may comprise a camera. The camera may be configured to transmit images captured thereby wirelessly. The camera may be configured to capture images as a video.

The vehicle may be configured to facilitate recharging of the electrical power source.

The weight of the auxiliary unit may be at least 40% of the weight of the vehicle. The weight of the auxiliary unit may be at least 50% of the weight of the vehicle.

The decoupling system may be configured to determine a maximum separation distance between the airborne unit and the auxiliary unit within which it (i.e., the decoupling system) is configured to maintain the electrical communication in the detached configuration of the vehicle. The flight system may be configured facilitate the airborne unit hovering, when the vehicle is in its detached configuration, above the auxiliary system up to a height equal to at least the maximum separation distance.

The flight system may comprise one or more selected from the group including rotors, motors, and flight controllers.

The auxiliary unit may further comprise a propulsion arrangement configured to facilitate locomotion thereof when the vehicle is in its detached configuration.

The propulsion arrangement may comprises a terrestrial propulsion arrangement configured to drive the auxiliary unit across land. The terrestrial propulsion arrangement may comprise one or more terrestrial propulsion elements selected from the group including wheels, tracks, rollers, leg mechanisms, metachronal arrangements, and combinations thereof.

The propulsion arrangement may comprise a marine propulsion arrangement configured to drive the auxiliary unit across water. The marine propulsion arrangement may comprise one or more marine propulsion elements selected from the group including propellers, rudders, and combinations thereof.

The propulsion arrangement may further comprise an auxiliary controller to direct operation thereof. The auxiliary controller may be configured to communicate with the flight system of the airborne unit.

The propulsion arrangement may be at least partially powered by the electrical power source.

The propulsion arrangement may be at least partially powered by an auxiliary power source.

According to another aspect of the presently disclosed subject matter, there is provided a method of flying a hovering aerial vehicle to deploy an auxiliary unit thereof, the method comprising:

providing the vehicle according to any one of the preceding claims;

the vehicle hovering, in its attached configuration, over a surface;

releasing the auxiliary unit to rest on the surface; and the flight system providing aerodynamic lift, thereby facilitating ascension of the airborne unit from the auxiliary unit;

wherein the aerodynamic lift is less than the weight of the vehicle, and greater than the weight of the airborne unit.

The aerodynamic lift may exceed the weight of the airborne unit by about 20% to about 50% of the weight of the auxiliary unit.

The hovering of the vehicle may be above the surface (i.e., such that no part of the vehicle contacts and/or is supported by the surface), and the releasing comprises lowering the auxiliary to rest on the surface.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

Figure 1A:
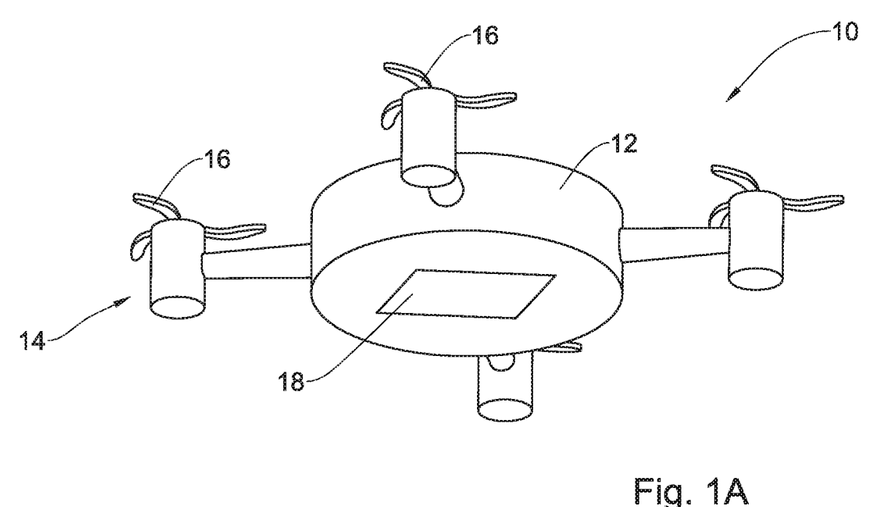
FIGS. 1A and 1B are bottom perspective views of a hovering aerial vehicle according to the presently disclosed subject matter, in attached and detached configurations thereof.
Figure 1B:
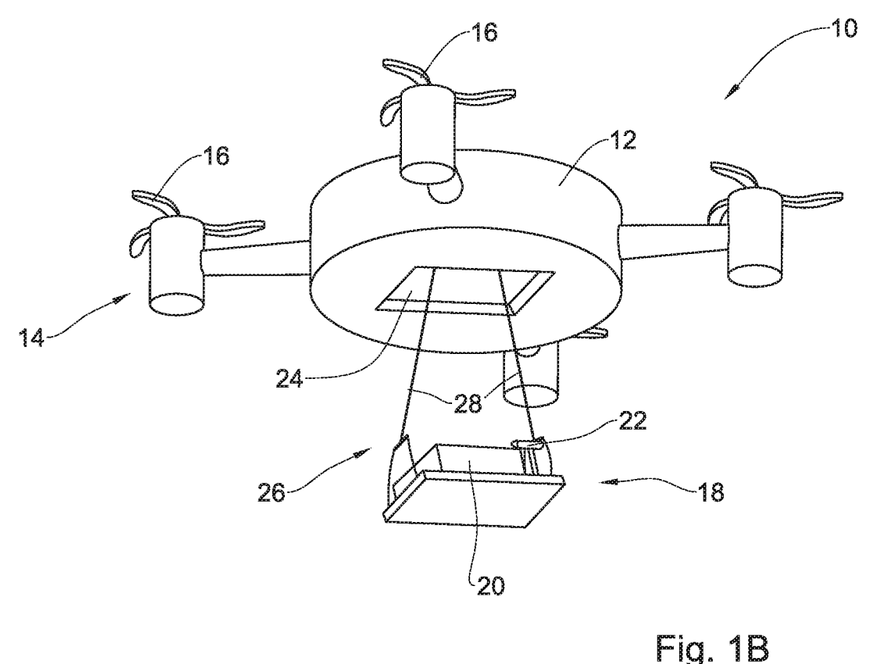

As illustrated in FIGS. 1A and 1B, there is provided a hovering aerial vehicle, which is generally indicated at 10. The vehicle 10 is configured to hover, i.e., remain in one place in the air, as well as move from place to place in the air, under its own power. Accordingly, it comprises an airborne unit 12 having a flight system 14 which provides the aerodynamic lift. The flight system 14 may also be utilized to facilitate the movement of the vehicle. According to some examples, the flight system 14 comprises a plurality of rotors 16, such as a quadcopter as illustrated in FIGS. 1A and 1B. The flight system 14 may further comprise other elements necessary to facilitate movement of the vehicle, including motors, one or more flight controllers, etc. It may further comprise sensors, alarms, etc. The vehicle may be unmanned, such as autonomous or controlled remotely by a human operator. According to some examples, it is a drone.

The airborne unit 12 may additionally comprise equipment (not illustrated), including, but not limited to, surveillance equipment such as video and/or audio recording devices, environmental sensors, GPS devices, communication equipment, etc., which may be required for carrying out unmanned missions as required.

In addition, the vehicle 10 comprises a controller (not illustrated) to direct operation thereof. It will be appreciated that while herein the specification and claims, the term "controller" is used in reference to a single element, it may comprise a combination of elements, which may or may not be in physical proximity, or directly connected, to one another, without departing from the scope of the presently disclosed subject matter, mutatis mutandis. In addition, disclosure herein (including recitation in the appended claims) of a controller carrying out, being configured to carry out, or other similar language, implicitly includes other elements of the system 10 carrying out, being configured to carry out, etc., those functions, without departing from the scope of the presently disclosed subject matter, mutatis mutandis.

The vehicle 10 further comprises an auxiliary unit 18 which carries a battery 20 for providing electrical power to the flight system 14 for its operation. It will be appreciated that while the present disclosure refers to a battery, according to some modifications, another suitable component or components configured to provide the necessary electrical power may be substituted therefor without departing from the scope of the presently disclosed subject matter, mutatis mutandis. Accordingly, the vehicle 10 is configured to maintain an electrical communication (e.g., such as an electrical connection, which may comprise, but is not limited to comprising, one or more physical connections) between the battery 20 and the flight system 14.

The auxiliary unit 18 may further comprise a camera 22, in addition to any camera provided on the airborne unit 12. The camera 22 may be configured to surveil the vicinity of the auxiliary unit 18. This may be useful, for example, when the auxiliary unit 18 is detached from the airborne unit (as will be described below), and resting on a surface in an area in which it may be subject to tampering. The camera 22 may be configured to capture video, and may be configured to transmit images captured thereby wirelessly, for example to the airborne unit, to a remote control center, etc.

The airborne unit 12 is configured to carry the auxiliary unit 18 during flight. According to some examples, the airborne unit 12 is configured to receive the auxiliary unit 18 therewithin, such as is illustrated in FIG. 1B. According to some modifications, the airborne unit 12 comprises a bay 24 formed on an underside thereof for accommodating therein the auxiliary unit 18.

The vehicle further comprises a decoupling system, which is generally indicated at 26, and only a portion of which is visible in FIGS. 1A and 1B. The decoupling system 26 is configured to switch the vehicle 10 between a detached configuration, wherein the airborne and auxiliary units 12, 18 are remote (i.e., physically detached) from each other, for example as illustrated in FIG. 1A, and an attached configuration, wherein the airborne and auxiliary units are secured to one another, for example as illustrated in FIG. 1B.

In addition, the decoupling system 26 comprises a suitable arrangement (not illustrated in FIGS. 1A and 1B) configured to maintain a tight mechanical connection between the airborne and auxiliary units 12, 18 when the vehicle 10 is in its attached configuration. When the airborne and auxiliary units 12, 18 are thus connected mechanically, they move together as a single unit.

The decoupling system is further configured to maintain the electrical communication between the battery 20 and the flight system 14 when the vehicle 10 is in its detached configuration. As the battery 20 (or other power source) typically constitutes a significant portion of the weight of the vehicle 10, by allowing the battery to be selectively detached from the airborne unit 12 and still supply electrical power thereto, the vehicle 10 may be operated in such a manner (e.g., with the auxiliary unit resting on an external surface, such as the ground, a roof, etc.) wherein it requires less power to hover, thereby extending its operational time.

According to some examples, the weight of auxiliary unit 18 (including the battery 20) constitutes at least 40% of the weight of the vehicle 10. According to other examples, it constitutes at least 50% of the weight of the vehicle 10.

According to some examples, the decoupling system 26 comprises one or more electrical cables 28 configured to span between the airborne unit 12 and the auxiliary unit 18 when the vehicle is in its detached configuration. The cables are connected at one end to the airborne unit 12, such that they are in electrical communication with elements of the flight system 14 (such as motors, flight controllers, etc.) which require electrical power from the battery 20, and at its other end with the battery.

The decoupling system 26 may thus comprise a single cable 28 having two conductive wires, one for carrying a positive electrical charge from the battery 20 to the flight system (i.e., it is connected to a positive terminal of the battery), and one for carrying a negative electrical charge therefrom (i.e., it is connected to a negative terminal of the battery).

Figure 2:
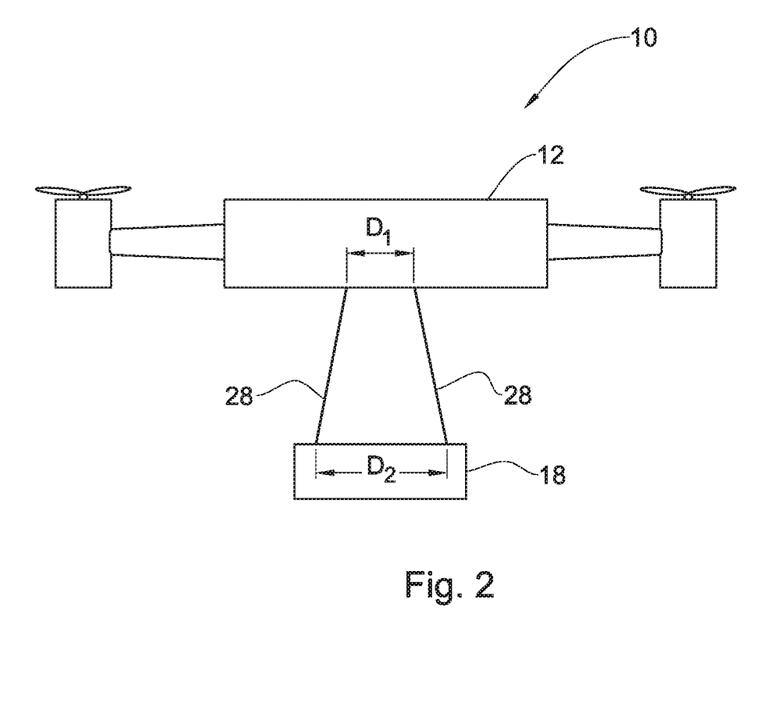
FIG. 2 is a schematic side view of the vehicle illustrated in FIGS. 1A and 1B in a detached configuration thereof, according to a modification thereof.

Alternatively, the decoupling system 26 may comprise two electrical cables 28 (such as is seen in FIG. 1B), connected to the battery 20 and flight system 14 as described above. As seen best in FIG. 2, according to one modification, the two cables 28 are connected to the airborne unit 12 at points of attachments which are spaced from each other a first distance $D_1$, and to the auxiliary unit 18 at points of attachments which are spaced from each other a second distance $D_2$, which is greater than $D_1$. According to this arrangement, the cables 28 are angled outwardly from each other when suspended from the airborne unit 12. This may increase the stability of the vehicle 10 in its detached configuration.

According to any of the examples wherein the decoupling system 26 comprises one or more cables 28, such as those described above with reference to and illustrated in FIGS. 1B and 2, the decoupling system may comprise a mechanism configured to selectively release and retract the cables, thereby facilitating the vehicle 10 switching between its detached and attached configurations, respectively. For example, as illustrated in FIG. 3, the decoupling system 26 may comprise a winch 30, for example connected to the airborne unit 12, to accomplish the releasing/retracting of the cable 28.

Figure 3:
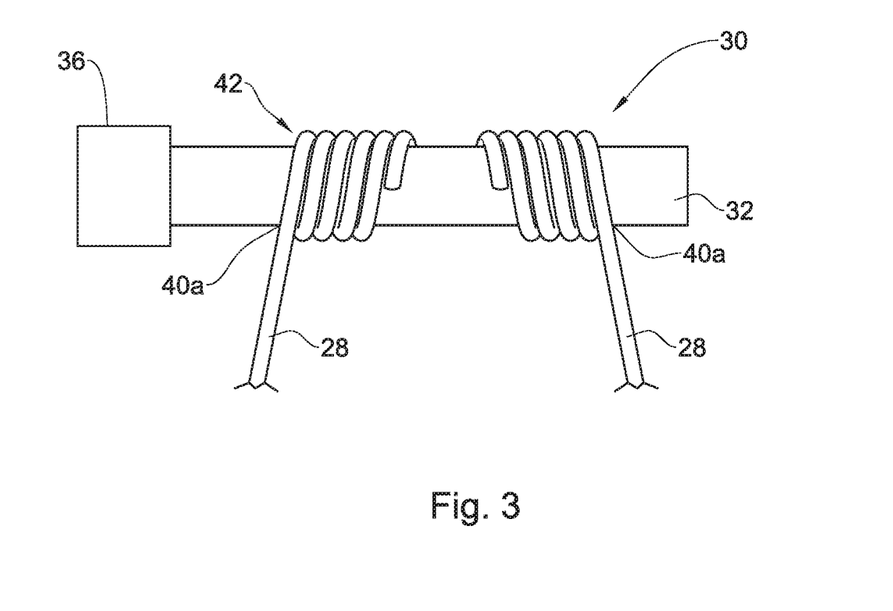
FIGS. 3 and 4 are side views of a winch of the vehicle illustrated in FIGS. 1A and 1B.

It will be appreciated that while FIG. 3 illustrates an example wherein the decoupling system 26 comprises two cables 28 released/retracted using a single winch 30, it may comprise a single cable released/retracted using a single winch, two cables released/retracted using two separate winches, or any other suitable combination of cables and winches.

The winch 30 comprises a drum 32 and a rotation arrangement, such as a motor 36 and optionally suitable transmissions elements (e.g., gears, pulleys, belts, etc.; not illustrated) for transmitting angular motion from the motor to the drum. Depending on the direction of rotation of the drum 32, the cable 28 is wound onto or unwound from the drum, as is well known in the art. Suitable guides (not illustrated) may be provided to facilitate the wrapping of the cable 28 around the drum 32.

According to examples wherein the decoupling system 26 comprises two cables 28 as described above with reference to the modification of FIG. 2 (i.e., wherein points of attachments with the airborne unit 12 are spaced from each other a first distance, and points of attachment with the auxiliary unit 18 are spaced from each other a second distance greater than the first distance), the points of attachment (indicated at 40a in FIG. 3) of the cables 28 with the airborne unit 12 are the points from which the cables 28 descend from the drum 32 of the winch 30. The cable 28 may be attached to the drum toward the center thereof. Owing to outward angle of the cables 28 from each other from each other the further they are from the airborne unit 12, the cables may, during retraction thereof by rotation of the drum 32, wrap around the drum in a single layer (as indicated at 42), i.e., with the wrapping of the cable around the drum advancing toward outward edges thereof, thereby facilitating an even distribution of the cable along the length of the drum during retraction.

Figure 4:
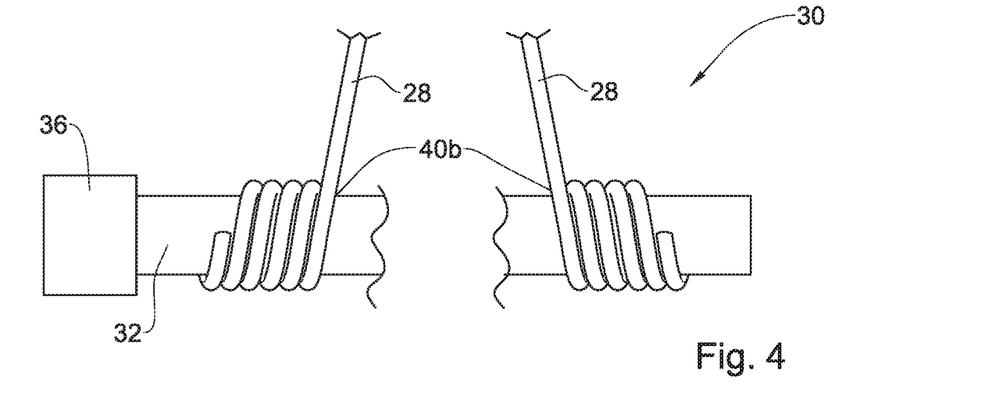

According to some examples, such as illustrated in FIG. 4, the winch 30 may be mounted to the auxiliary unit 18, thereby further reducing the weight of the airborne unit. According to examples wherein the decoupling system 26 comprises two cables 28 as described above with reference to the modification of FIG. 2 (i.e., wherein points of attachments with the airborne unit 12 are spaced from each other a first distance, and points of attachment with the auxiliary unit 18 are spaced from each other a second distance greater than the first distance), the points of attachment (indicated at 40b in FIG. 4) of the cables 28 with the auxiliary unit 18 are the points from which the cables 28 ascend from the drum 32 of the winch 30. The cable 28 may be attached to the drum toward edges thereof. Owing to inward angle of the cables 28 from each other the further they are from the auxiliary unit 18, the cables may, during retraction thereof by rotation of the drum 32, wrap around the drum in a single layer (as indicated at 42), i.e., with the wrapping of the cable around the drum advancing toward the center thereof, thereby facilitating an even distribution of the cable along the length of the drum during retraction.

The motor 36 may be configured to facilitate determining the tautness of the cables 28. For example, it may be connected to the controller in such a way as to allow the current thereacross during use. It will be appreciated by pone having skill in the art that the tautness of the cables 28 can be related to the current across the motor 36 during use, for example when the cables are fully retracted. The controller may thus be configured to determine the tautness of the cables 28 by measuring (or using reported measurements of) the current across the motor 36. This may be useful, for example during detachment and attachment of the auxiliary unit 18 from/to the airborne unit 12, as will be described below.

According to some modifications, the controller is configured for determining the absolute tautness of the cables 28 (e.g., by measuring the tension thereof), in which case relevant information, for example physical characteristics of the cables, are preloaded in the controller. According to other modifications, the controller is configured for determining the relative tautness of the cable 28, for example operating the vehicle 10 in such a way as to exert a known reference tautness, and measuring the current across the motor 36 to obtain a reference measurement. The reference measurement may be utilized, e.g., by comparing subsequent measurement thereto—those vary from the reference in a given direction (e.g., lower) by a predetermined amount may be determined to indicate that the cable 28 is not sufficiently taut, and that appropriate corrective action may be required.

It will be appreciated that while the controller has been described above as being configured to determine the tautness of the cables 28 using measurements of the current across the motor, it may be configured to do so using any other suitable method, mutatis mutandis.

According to some examples, the vehicle 10 is configured to facilitate the airborne unit 12 and auxiliary unit 18 to be both physically detached and untethered (e.g., without a cable, such as described above with reference to reference numeral 28) while in its detached configuration. Accordingly, decoupling system 26 may comprise elements for facilitating maintaining the electrical communication between the battery 20 and the flight system 14 when in its detached configuration, such as a system for facilitating wireless energy transmission. Many suitable systems are well known, and one having skill in the relevant art would be able to implement (e.g., including making necessary adaptations) a suitable system for the electrical communication, given the parameters of the vehicle 10. Such parameters may include, but are not limited to, the power requirements of the airborne unit 12, the transmission capacity of the wireless energy transmission system, level of security necessary during operation of the vehicle 10, etc.

According to some examples, the vehicle 10 comprises a tracking system to facilitate the airborne unit 12 to locate the auxiliary unit 18, e.g., when the vehicle is in its detached configuration. The tracking system may further facilitate navigation of the airborne unit 12 to the auxiliary unit 18. The tracking system may comprise elements (not illustrated) on both the airborne and auxiliary units 12, 18, such as a transponder on the auxiliary unit and a receiver on the airborne unit. According to some modifications, the transponder may be located on the airborne unit 12, with the auxiliary unit 18 comprising the receiver and being configured (for example using a dedicated processor included therein) to issue flight commands to the airborne unit to navigate it thereto based on the location determined using the receiver.

According to some modifications, the decoupling system 26 is configured for maintaining the electrical communication using wireless energy transmission, as described above, and further utilizes the wireless energy transmission system as or to complement the tracking system. For example, the wireless energy transmission system may be configured to perform multi-coil magnetic beamforming for both energy transmission and tracking, for example as disclosed in "Magnetic MIMO: How to Charge Your Phone in Your Pocket" by Jouya Jadidian & Dina Katabi, published in "Proceedings of the 20th annual International Conference on Mobile Computing and Networking", by the Association for Computing Machinery, Pages 495-506, the entire contents of which are incorporated herein by reference.

It will be appreciated that while the use of a tracking system such as described herein is particularly useful wherein the vehicle 10 is configured to facilitate the airborne and auxiliary units 12, 18 to be both physically detached and untethered in its detached configuration such as described above, it may also be useful wherein the vehicle is designed to maintain a physical tether between the two.

According to some examples, the airborne and auxiliary units 12, 18 are co-configured such that the electrical communication between the battery 20 and the flight system 14 may be established, when the vehicle is in its attached configuration, using elements separate from the decoupling system 26 (i.e., bypassing at least some elements which constitute part of the decoupling system and are configured to electrically connect between the batter and the flight system when the airborne and auxiliary units are located at a distance from one another). The airborne and auxiliary units 12, 18 may comprise a direct-connection arrangement, for this purpose. The direct-connection arrangement is configured to electrically bypass decoupling system 26 (e.g., according to examples above, to bypass the cable 28) when the vehicle 10 is in its attached position. Accordingly, any electrical losses which may be incurred by maintaining the electrical communication using the decoupling system 26 (for example owing the electrical resistance inherent therein) when the vehicle 10 is in its attached position may be avoided by providing a direct connection between the airborne and auxiliary units 12, 18.

Figure 5:
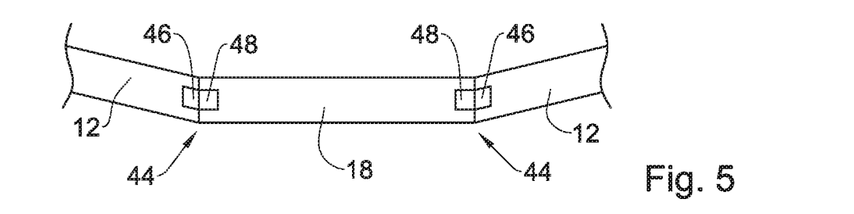
FIG. 5 is a close-up sectional view of an airborne unit and an auxiliary unit of the vehicle illustrated in FIGS. 1A and 1B, according to a modification thereof.

As illustrated in FIG. 5, the direct-connection arrangement, which is generally indicated at 44, may comprise contacts 46, 48, provided on the airborne and auxiliary units 12, 18, respectively. Contacts 46 provided on the airborne unit 12 are in electrical communication with the flight system 14, and contacts 48 provided on the auxiliary unit 18 are in electrical communication with the battery 20. The contacts 46, 48 are situated such that when the airborne and auxiliary units 12, 18 are secured to one another in the attached configuration of the vehicle, the contacts touch one another, thereby providing an electrical path between the battery 20 and the flight system 14. A mechanical securing arrangement (not illustrated), for example comprising one or more of clips, slides, latches, etc., may be provided to facilitate and maintain the disposition between the contacts 46, 48. The direct-connection arrangement 44 and/or the decoupling system 26 may be configured to interrupt the electrical communication provided by the decoupling system when the direct-connection arrangement is provides the electrical communication.

It will be appreciated that while the direct-connection arrangement 44 has been described herein as being distinct from the decoupling system 26 and elements thereof, it may be provided as part of the decoupling system, sharing elements therewith, etc., without departing from the scope of the presently disclosed subject matter, mutatis mutandis.

Figures 6A, 6B:
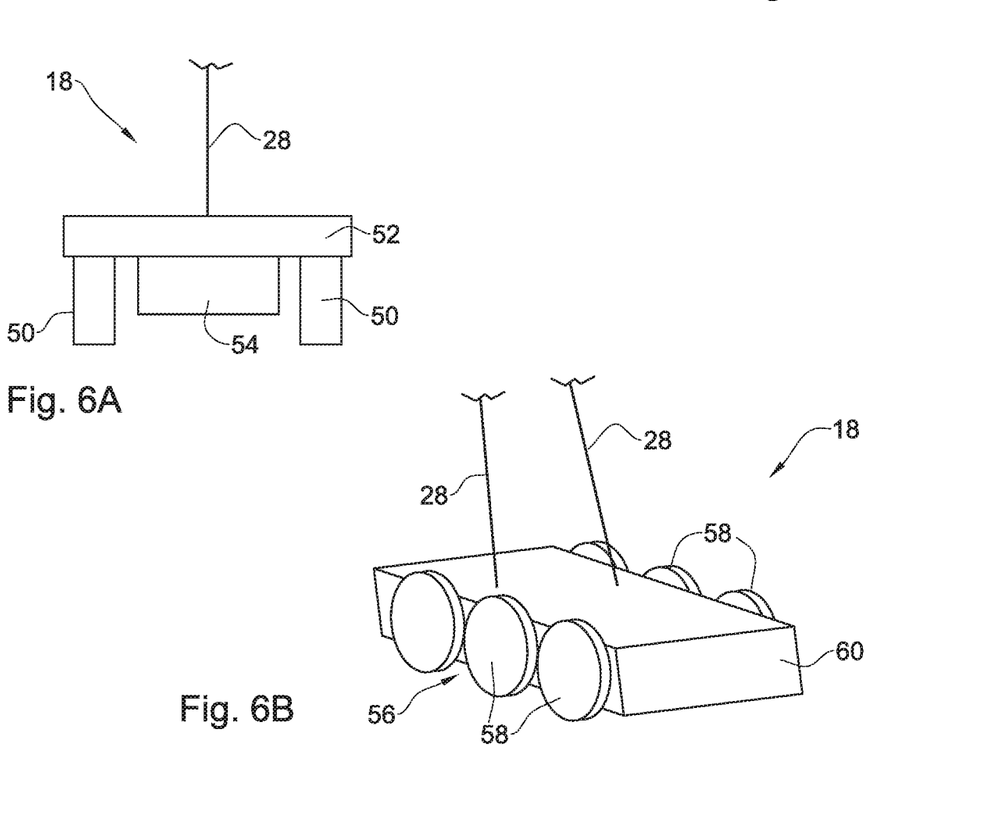
FIG. 6 is a side view of an example of an auxiliary unit of the vehicle illustrated in FIGS. 1A and 1B.

According to some examples, the auxiliary unit 18 may be configured for floating on water. This may be useful, e.g., for use of the vehicle 10 in coastal areas. Accordingly, as illustrated in FIG. 6A, the auxiliary unit 18 comprises one or more floats 50 configured to provide sufficient buoyancy to the auxiliary unit (including the battery 20) to keep it afloat in water. The auxiliary unit 18 may further comprise an adapter 52 configured to connect to the decoupling system 26 (such as a cable 28 thereof, as illustrated), and to which the battery 20, floats 50, and other elements of the auxiliary unit 18 are mounted. The auxiliary unit 18 may further comprise a watertight housing 54 in which the battery 20 is contained. The housing 54 may comprise suitable apertures (not illustrated) for passage therethrough of, e.g., electrical wires. The apertures may be provided with seals configured to allow passage therethrough of the wires while preventing ingress of water.

According to other examples, the auxiliary unit 18 may be configured for driving itself across land (including, but not limited to, any substantially solid surface, such as buildings, etc.). Accordingly, as illustrated in FIG. 6B, it may comprise a terrestrial propulsion arrangement, one non-limiting example of which is illustrated and indicated at 56, configured to facilitate locomotion of the auxiliary unit 18 while on land. The terrestrial propulsion arrangement 56 may be powered by the battery 20 and/or a dedicated power source, and comprises one or more terrestrial propulsion elements, including, but not limited to, wheels 58 (as illustrated), tracks, rollers, leg mechanisms, and/or metachronal arrangements (e.g., to facilitate slithering). A housing 60 may be provided to contain the battery (not illustrated), and to carry elements of the terrestrial propulsion arrangement 56.

The terrestrial propulsion arrangement 56 may further comprise one or more controllers configured to direct operation thereof. Alternatively, the flight system 14 of the airborne unit 12 may be configured to direct operation of the terrestrial propulsion arrangement 56. According to some examples, the terrestrial propulsion arrangement 56 may comprise a controller to direct operation thereof, which receives input from the flight system 14 of the airborne unit 12. According to examples in which the flight system 14 of the airborne unit 12 contributes to directing the operation of the terrestrial propulsion arrangement 56, communication therebetween may be provided wirelessly, via cables spanning therebetween (e.g., using one or more dedicated cables, sending a signal over cable(s) 28 for example employing a power-line communication protocol, etc.).

According to further examples, the auxiliary unit 18 may comprise a marine propulsion arrangement, configured to facilitate locomotion thereof across water, for example across a surface thereof or submerged thereunder. According to some examples, the auxiliary unit 18 is provided according to the example described above with reference to and illustrated in FIG. 6A. The marine propulsion arrangement may be similar, mutatis mutandis, to the terrestrial propulsion arrangement 56 described above with reference to and illustrated in FIG. 6B, comprising one or more suitable marine propulsion elements (e.g., propellers, rudders, etc.) instead of terrestrial propulsion elements.

It will be appreciated that the auxiliary unit 18 may be provided with both a terrestrial propulsion system and a marine propulsion system, or a single propulsion system that may selectively function as either, mutatis mutandis.

Figure 7:
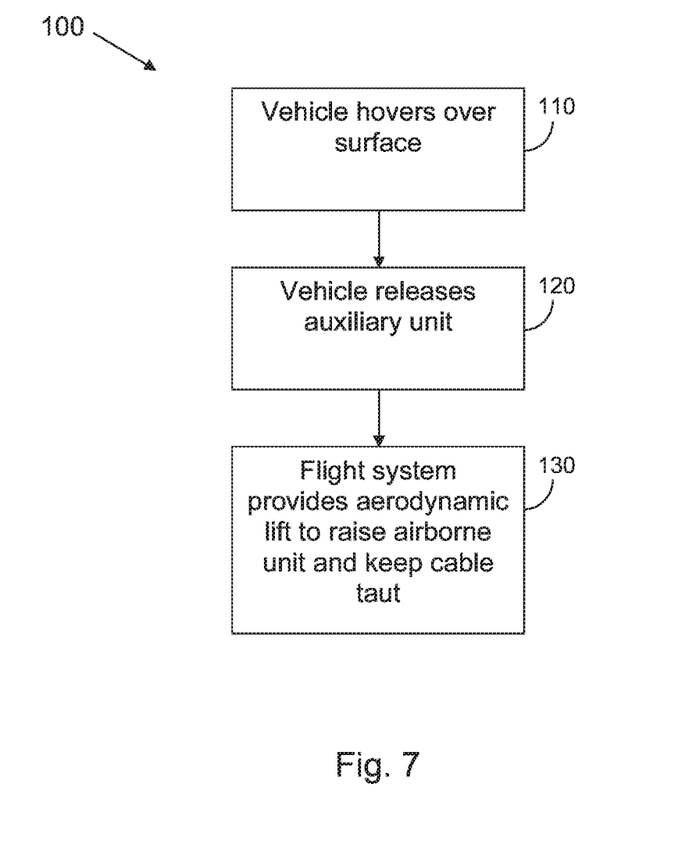
FIG. 7 illustrates a method of deploying an auxiliary unit of the vehicle illustrated in FIGS. 1A and 1B.

As illustrated in FIG. 7, the vehicle 10 may be configured to deploy the auxiliary unit 18, for example on a roof or other surface, by operating to perform a method indicated at 100. According to examples wherein the decoupling system 26 comprises one or more cables 28, deploying the auxiliary unit 18 may facilitate mitigating the possibility of the cable becoming entangled with part of the airborne unit 12, such as propellers, etc., such as if the airborne unit pitches, rolls, or experiences any other unanticipated movement.

In step 110 of the method 100, the vehicle 10 hovers over the surface. It may hover above the surface (e.g., a small distance thereabove), or such that the auxiliary unit 18 is in contact with the surface.

In step 120 of the method 100, the vehicle 10 releases the auxiliary unit 18 to rest on the surface, i.e., it switches to its detached configuration.

In step 130, the flight system 14 provides aerodynamic lift to the airborne unit 12, thereby facilitating its ascent from the auxiliary unit 18, which remains on the surface. The aerodynamic lift is sufficient to raise the airborne unit 12 without lifting the auxiliary unit 18, while keeping the cable 28 taut. Thus, it may be less than the weight of the vehicle 10 (i.e., the combined weight of the airborne unit 12, auxiliary unit 18, and decoupling system 26), and more than the weight of the airborne unit (including any elements of the decoupling system rigidly mounted thereto). The aerodynamic lift may exceed the weight of the airborne unit 12 by about 20-50% of the weight of the auxiliary unit 18.

The vehicle 10 may be further configured to collect the auxiliary unit 18 when deployed by operating the method in reverse, mutatis mutandis.

Those skilled in the art to which this invention pertains will readily appreciate that numerous changes, variations and modifications can be made without departing from the scope of the invention mutatis mutandis.

The invention claimed is:

1. A hovering aerial vehicle, comprising:
an airborne unit including a flight system that is configured to facilitate providing aerodynamic lift to facilitate hovering of the hovering aerial vehicle;
an auxiliary unit including an electrical power source in electrical communication with the flight system to provide electrical power for operation thereof;
wherein the airborne unit comprises a bay configured to at least partially receive therewithin the auxiliary unit during flight; and
a decoupling system configured to:
facilitate, during the flight while the electrical power is being provided to the airborne unit by the auxiliary unit, selectively switching the hovering aerial vehicle between a detached configuration thereof in which the auxiliary unit is completely out of the bay and continues to provide said electrical power to the airborne unit, and an attached configuration thereof in which the auxiliary unit is positioned at least partially within the bay, and the airborne and auxiliary units are secured to one another; and
maintain the electrical communication when the hovering aerial vehicle is in the detached configuration;
wherein the hovering aerial vehicle is configured, in the detached configuration, for ascension of the airborne unit from the auxiliary unit when the auxiliary unit is resting on an external surface.

2. The hovering aerial vehicle according to claim 1, wherein the hovering aerial vehicle is configured, when in the attached configuration, to provide electrical communication between the electrical power source and the flight system using elements separate from the decoupling system.

3. The hovering aerial vehicle according to claim 1, wherein the decoupling system includes one or more cables configured to maintain the electrical communication and attached, at opposite ends thereof, to the airborne and auxiliary units.

4. The hovering aerial vehicle according to claim 3, wherein the decoupling system includes two of the one or more cables, wherein points of attachments of the one or more cables to the airborne unit are spaced from each other a first distance, and points of attachments of the one or more cables to the auxiliary unit are spaced from each other a second distance greater than the first distance.

5. The hovering aerial vehicle according to claim 4, wherein the decoupling system includes a winch mounted to the airborne unit and configured to selectively release and retract the one or more cables.

6. The hovering aerial vehicle according to claim 4, wherein a first of one or more the cables carries a positive electrical charge from the electrical power source to the flight system, and a second of the one or more cables carries a negative electrical charge from the electrical power source to the flight system.

7. The hovering aerial vehicle according to claim 3, wherein the decoupling system is configured to determine a tautness of the one or more cables when the vehicle is in the detached configuration.

8. The hovering aerial vehicle according to claim 7, wherein the decoupling system includes a motor and is configured to detect the tautness by measuring a current thereof.

9. The hovering aerial vehicle according to claim 1, wherein the decoupling system is configured to maintain the electrical communication using wireless energy transmission.

10. The hovering aerial vehicle according to claim 1, further comprising a tracking system configured to facilitate location of the auxiliary unit and to facilitate navigation of the airborne unit thereto.

11. The hovering aerial vehicle according to claim 1, wherein the auxiliary unit includes a floatation arrangement configured to facilitate the auxiliary arrangement floating on a body of water.

12. The hovering aerial vehicle according to claim 1, wherein the auxiliary unit includes a camera.

13. The hovering aerial vehicle according to claim 1, being configured to facilitate recharging of the electrical power source.

14. The hovering aerial vehicle according to claim 1, wherein the auxiliary unit has a weight that is at least 40% of a weight of the hovering aerial vehicle.

15. The hovering aerial vehicle according to claim 1, wherein the decoupling system is configured to determine a maximum separation distance between the airborne unit and the auxiliary unit within which the decoupling system is configured to maintain the electrical communication in the detached configuration of the vehicle.

16. The hovering aerial vehicle according to claim 15, wherein the flight system is configured to facilitate the airborne unit hovering, when the hovering aerial vehicle is in the detached configuration, above the auxiliary system up to a height equal to at least the maximum separation distance.

17. The hovering aerial vehicle according to claim 1, wherein the auxiliary unit includes a propulsion arrangement configured to facilitate locomotion thereof when the hovering aerial vehicle is in the detached configuration.

18. The hovering aerial vehicle according to claim 17, wherein the propulsion arrangement includes a terrestrial propulsion arrangement configured to drive the auxiliary unit across land.

19. The hovering aerial vehicle according to claim 17, wherein the propulsion arrangement includes a marine propulsion arrangement configured to drive the auxiliary unit across water.

20. The hovering aerial vehicle according to claim 17, wherein the propulsion arrangement includes an auxiliary controller to direct operation thereof.

* * * * *